(12) United States Patent
Katz et al.

(10) Patent No.: US 7,552,885 B2
(45) Date of Patent: Jun. 30, 2009

(54) BLENDER BLADE

(75) Inventors: Jonathan M. Katz, Solon, OH (US);
David J. Kolar, Stow, OH (US);
Richard D. Boozer, Wakeman, OH
(US); Michael D. Anton, Olmstead
Township, OH (US)

(73) Assignee: Vita-Mix Corporation, Cleveland, OH
(US)

( * ) Notice: Subject to any disclaimer, the term of this
patent is extended or adjusted under 35
U.S.C. 154(b) by 0 days.

(21) Appl. No.: 11/901,156

(22) Filed: Sep. 17, 2007

(65) Prior Publication Data

US 2008/0008029 A1 Jan. 10, 2008

Related U.S. Application Data

(63) Continuation of application No. 10/763,964, filed on Jan. 23, 2004, now Pat. No. 7,278,598.

(51) Int. Cl.
*B01F 15/00* (2006.01)
*B01F 7/16* (2006.01)
*B02C 18/06* (2006.01)
*B02C 18/18* (2006.01)
*B02C 18/08* (2006.01)

(52) U.S. Cl. .................... 241/282.1; 366/205; 366/343; 241/292.1; 416/237

(58) Field of Classification Search ............. 366/330.3, 366/330.7, 205, 343; 241/282.1, 292.1, 282.2; 416/202, 237
See application file for complete search history.

(56) References Cited

U.S. PATENT DOCUMENTS

| 941,948 | A | * | 11/1909 | Rees | 366/327.3 |
|---|---|---|---|---|---|
| 2,576,802 | A | * | 11/1951 | Morris | 241/282.1 |
| 2,585,255 | A | * | 2/1952 | Kochner et al. | 241/282.2 |
| 2,702,571 | A | * | 2/1955 | Murrray | 241/282.1 |
| 2,788,038 | A | * | 4/1957 | Corcoran | 241/292.1 |
| 2,799,485 | A | * | 7/1957 | Silverman | 366/312 |
| D181,373 | S | * | 11/1957 | Schmidt | D7/412 |
| 2,897,862 | A | * | 8/1959 | Malz et al. | 366/205 |
| 2,964,301 | A | * | 12/1960 | Bosse | 366/329.3 |
| 3,030,083 | A | * | 4/1962 | Stiffler | 366/316 |
| 3,036,614 | A | * | 5/1962 | Knapp | 241/292.1 |
| 3,147,958 | A | * | 9/1964 | Stiffler | 366/327.3 |
| 3,175,594 | A | * | 3/1965 | Jepson et al. | 366/205 |
| 3,333,831 | A | * | 8/1967 | Chapman | 366/343 |
| 3,368,800 | A | * | 2/1968 | Barnard, Jr. | 241/282.2 |

(Continued)

*Primary Examiner*—Tony G Soohoo
(74) *Attorney, Agent, or Firm*—Renner, Kenner, Greive, Bobak, Taylor & Weber

(57) ABSTRACT

In one embodiment of the invention, a blender blade (10) includes a body portion (12) having an upper surface (15) and a lower surface (16). The body portion includes an aperture (13) effectively defining an axis of rotation for the blender blade (10). A first blade wing (21) extends from the body portion (12) and has an upper surface (23) and a lower surface (25). A second blade (22) wing extends from the body portion (12) and has an upper surface (24) and a lower surface (26). A leading edge (41) is provided on the first blade wing (21) and a leading edge (42) is provided on the second blade wing (22), the leading edges (41, 42) being adapted to cut through a working medium during rotation of the blender blade (10). At least one wing flap (51, 52) extending outwardly, selectively from the first blade wing (21) and the second blade wing (22).

12 Claims, 6 Drawing Sheets

U.S. PATENT DOCUMENTS

| | | | |
|---|---|---|---|
| 3,404,870 A * | 10/1968 | Multer | 366/307 |
| 4,147,437 A * | 4/1979 | Jonqueres | 366/343 |
| 4,519,715 A * | 5/1985 | Golobic et al. | 366/343 |
| 5,052,892 A * | 10/1991 | Fasano | 416/204 R |
| 5,425,579 A * | 6/1995 | Sampson | 366/314 |
| 5,599,103 A * | 2/1997 | Linscott | 366/343 |
| 5,647,546 A * | 7/1997 | Sinovas et al. | 241/292.1 |
| 5,655,834 A * | 8/1997 | Dickson | 366/205 |
| 6,092,922 A * | 7/2000 | Kett et al. | 366/205 |
| 6,106,232 A * | 8/2000 | Wagner | 416/202 |
| D433,282 S * | 11/2000 | Bohannon et al. | D7/412 |
| D435,192 S * | 12/2000 | Bohannon et al. | D7/413 |
| D488,347 S * | 4/2004 | Boozer et al. | D7/412 |
| 6,796,707 B2 * | 9/2004 | Gigas et al. | 366/327.1 |
| 6,834,818 B2 * | 12/2004 | Lee | 241/292.1 |
| 6,974,099 B2 * | 12/2005 | Kolar et al. | 241/282.1 |
| D513,685 S * | 1/2006 | Katz et al. | D7/412 |
| 2002/0139884 A1 * | 10/2002 | Williams et al. | 241/282.1 |

* cited by examiner

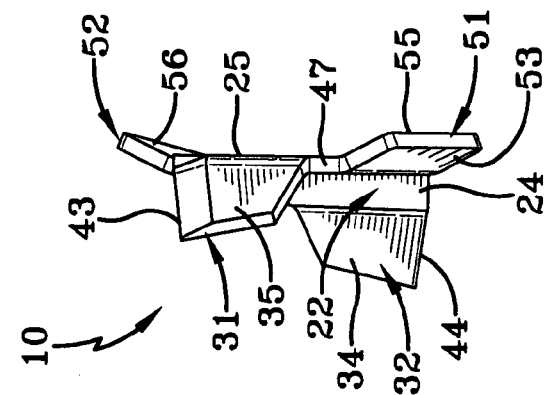
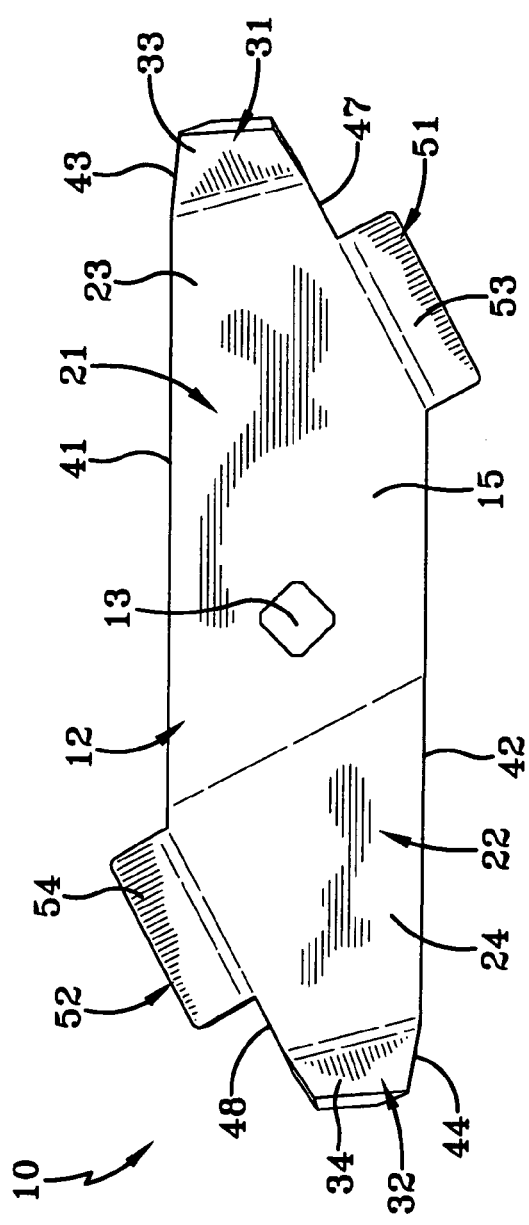
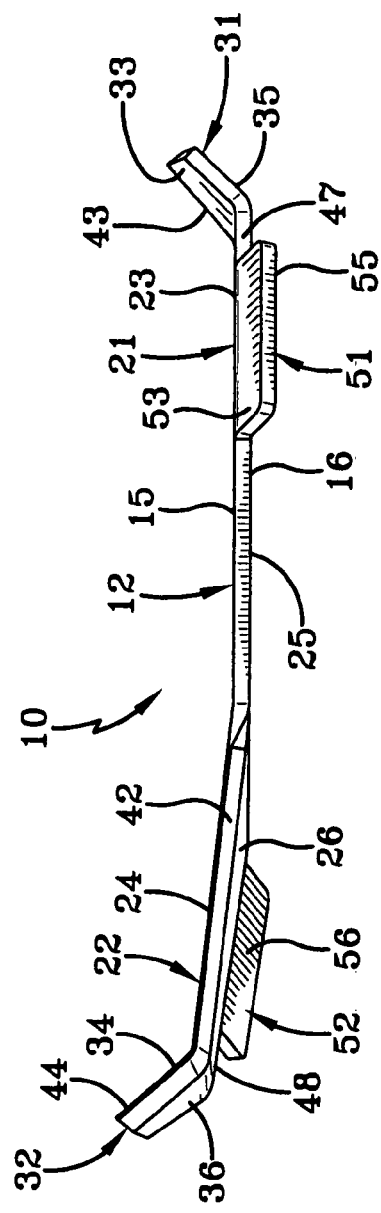

BLENDER BLADE

CROSS-REFERENCE TO RELATED APPLICATION

This application is a continuation of U.S. patent application Ser. No. 10/763,964 filed on Jan. 23, 2004 now U.S. Pat. No. 7,278,598.

TECHNICAL FIELD

The present invention relates to a blade for use in a blender or a food processor. More specifically, the present invention relates to a blender blade having wing flaps configured to control the axial flow of a working medium provided in the blender pitcher. More particularly, the present invention relates to a blender blade, wherein the selective orientation of the wing flaps can provide upwardly directed axial flow and downwardly directed axial flow.

BACKGROUND ART

Generally, a blender blade has two blade wings extending in opposite directions from a blade body. Each of the two blade wings are equipped with cutting surfaces along their leading edges. During operation of a blender, the blender blade rotates about an axis of rotation, and the cutting surfaces cut through the working medium provided in the blender pitcher. Oftentimes, the blade wings are angled in relation to the blade body to provide the blade wings with angles of attack. Varying the angles of attack of the blade wings is used to control the axial flow of the working medium.

In order to understand the consequences of angling the blade wings in relation to the blade body, the angle of attack in relation to airfoils must be understood. With airfoils, the angle of attack is determined in relation to the chord line of the airfoil. The chord line is the line drawn from the leading edge to the trailing edge of the airfoil, and the angle of attack is the angle formed between the chord line and horizontal. As the angle of attack of the airfoil is varied, the "lift" generated by the airfoil is also varied.

For example, when an airfoil has a positive angle of attack, the flowing medium impinges on the lower surface of the airfoil. Consequently, the angle of attack causes the lower surface to deflect flowing medium away from the airfoil. The amount of deflection is related to the orientation of the airfoil. That is, there is more deflection when there is a high angle of attack and less deflection when there is a low angle of attack. Such deflection generates low pressures adjacent the upper surface of the airfoil. For example, the lower surface pushes flowing medium away from the path of the airfoil, and an absence of flowing medium is thereby created adjacent to the upper surface of the airfoil. Due to this absence of flowing medium, low pressures are provided adjacent the upper surface, and these low pressure generate the above-discussed lift. As such, higher angles of attack produce lower pressures adjacent the upper surface to generate more lift, and lower angles of attack produce lower pressures adjacent the upper surface to generate less lift.

The lift generated by the angle of attack of the above-discussed airfoil can be equated with the axial flow generated by the angle of attack of a blade wing. However, unlike the above discussed airfoil, the angle of attack of a blade wing is determined by the forward or rearward "twist" of the blade wing (relative to its leading edge) along its longitudinal length. This twist determines how much working medium impinges the upper surface or lower surface of the blade wing. Without such impingement of working medium, the angle of attack would effectively be zero. For example, if the blade wing was angled upwardly or downwardly (but not twisted forwardly or rearwardly), the working medium would not impinge the blade wing, and the angle of attack of such a blade wing would be effectively zero.

To create the necessary angle of attack, the blade wing is twisted forwardly or rearwardly. When the blade wing is twisted forwardly, the working medium impinges the upper surface, and when the blade wing is twisted rearwardly, the working medium impinges the lower surface. The amount of twisting determines the amount of impingement, and amount of axial flow, while the direction of the twisting (forwardly or rearwardly relative to its leading edge) determines the direction of the axial flow. For example, if the blade wing is twisted forwardly relative to its leading edge, the working medium will impinge the upper surface of the blade wing, and low pressures will be generated adjacent the lower surface, thereby drawing working medium from above to below the blender blade. On the other hand, if the blade wing is twisted rearwardly relative to its leading edge, the working medium will impinge the lower surface, and low pressure will be generated adjacent the upper surface, thereby drawing working medium from below to above the blender blade. Either way, working medium is drawn through the cutting pattern of the blade wing.

Because the blade wings must be twisted to generate the necessary flow of working medium, the cutting pattern defined by the orientation of the leading edges of the blade wings is substantially frusto-conical. In fact, any twisting of the blade wing to adjust the angle of attachment will create a substantially frusto-conical cutting pattern. However, ideal cutting patterns have substantially planar components. Therefore, there is a need to control the axial flow of the working medium (both the amount and direction thereof) irrespective of the angle of attack of the blade wing. Such independent control would allow the cutting pattern to have a substantially planar component to create an efficient impact vector, and avoid the necessity of providing both blade wings with an angle of attack.

DISCLOSURE OF THE INVENTION

It is thus an object of the present invention to provide a blender blade of a configuration providing for more efficient blending of the medium being blended.

It is another object of the present invention to provide a blender blade, as above, which is configured to control the axial flow of the working medium provided in a blender pitcher.

It is yet another object of the present invention is to provide a blender blade, as above, which is capable of controlling the axial flow of the working medium irrespective of the angle of attack of the blade wing.

It is yet another object of the present invention to provide a blender blade, as above, with at least one wing flap to control the direction of the axial flow of working medium.

It is still another object of the present invention to provide a blender blade, as above, which may have the wing flap oriented selectively upwardly or downwardly to selectively control the direction of the axial flow of the working medium.

These and other objects of the present invention, as well as the advantages thereof over existing prior art forms, which will become apparent for the description to follow, are accomplished by the improvements hereinafter described and claimed.

In general, a blender blade made in accordance with the present invention includes a body portion having an upper surface and a lower surface. The body portion includes an aperture effectively defining an axis of rotation for the blender blade. A first blade wing extends from the body portion and has an upper surface and a lower surface. A second blade wing extends from the body portion and has an upper surface and a lower surface. A leading edge is provided on the first blade wing and a leading edge is provided on the second blade wing, the leading edges being adapted to cut through the working medium during rotation of the blender blade. At least one wing flap extending outwardly, selectively from the first blade wing and the second blade wing.

A preferred exemplary blender blade according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is an plan view taken from above the blender blade of FIG. 1.

FIG. 3 is an elevational view taken from the front of the blender blade of FIG. 1.

FIG. 4 is an elevational view taken from the side of the blender blade of FIG. 1.

PREFERRED EMBODIMENTS FOR CARRYING OUT THE INVENTION

Figure 1:
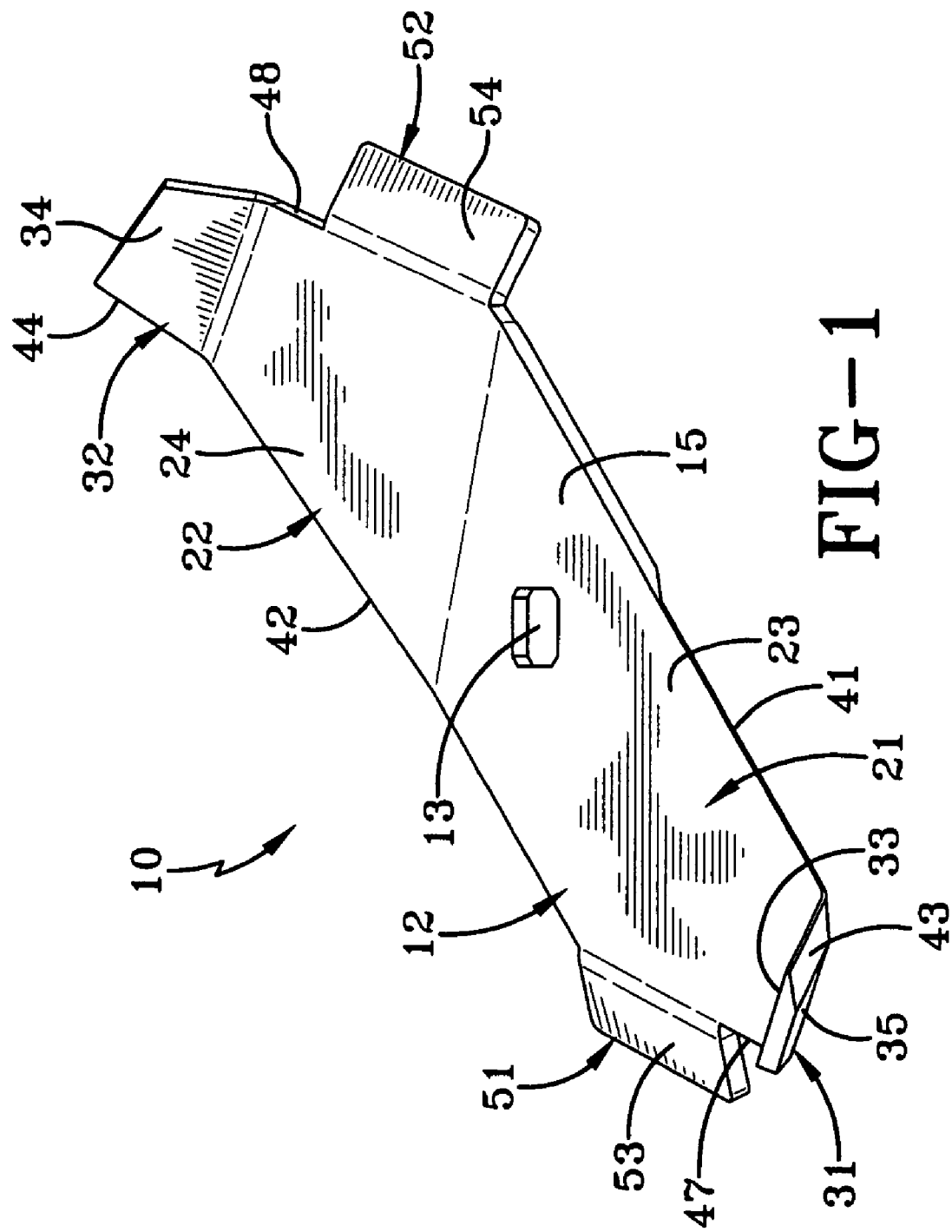
FIG. 1 is a perspective view of a blender blade made in accordance with one embodiment of the present invention.
Figure 5:
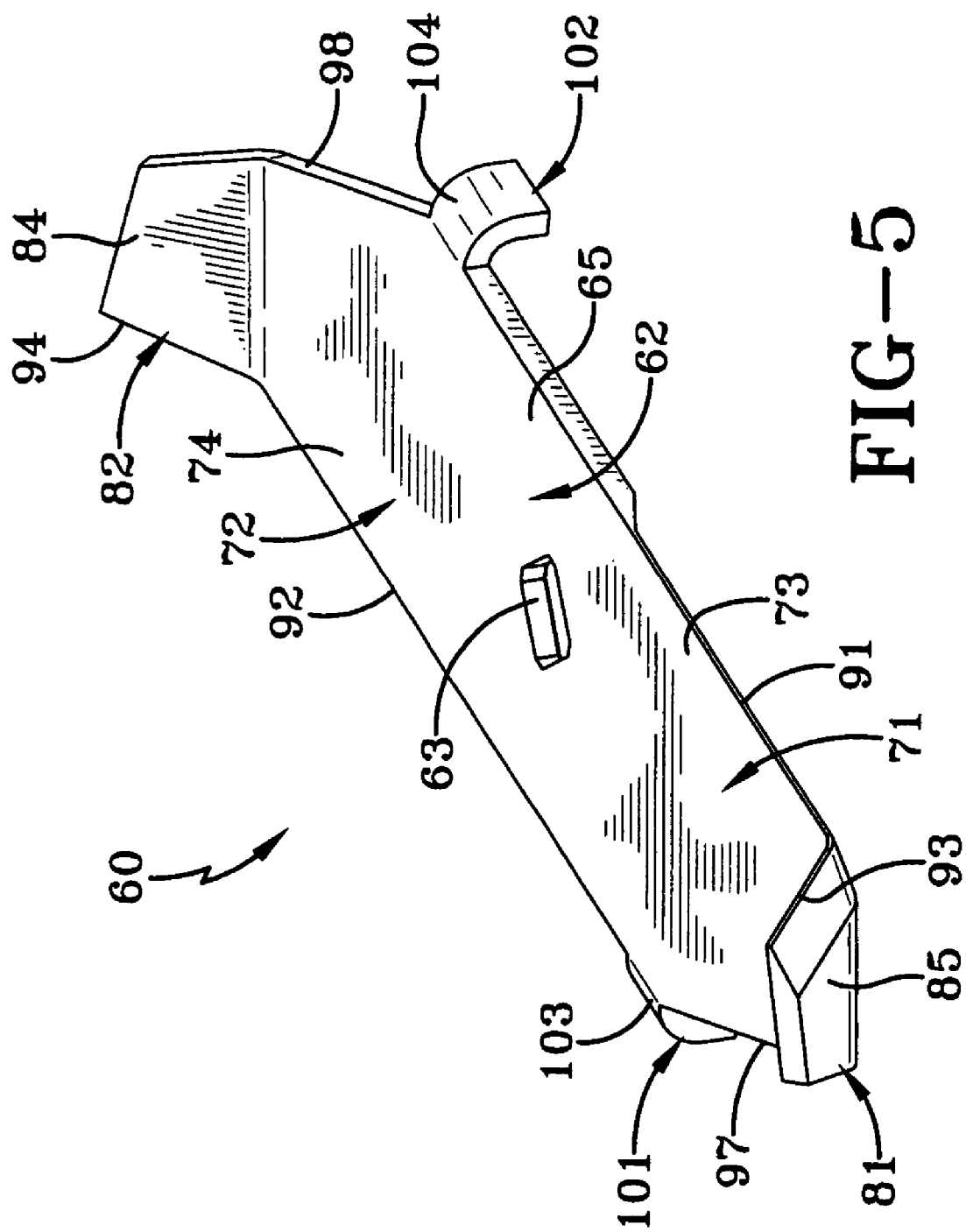
FIG. 5 is a perspective view of a blender blade made in accordance with another embodiment of the present invention.
Figure 8:
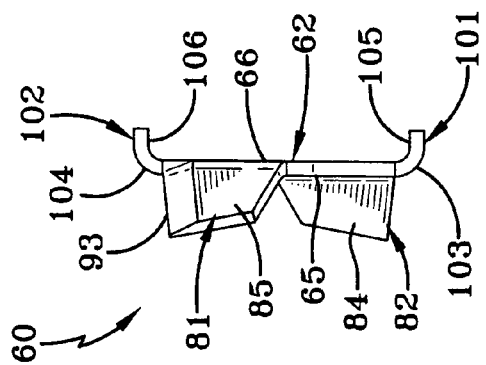
FIG. 8 is an elevational view taken from the side of the blender blade of the embodiment of FIG. 5.

A blender blade made in accordance with one embodiment of the present invention is generally indicated by the numeral 10, and is shown in FIGS. 1-4. Blade 10 includes a body portion 12 having an aperture 13 adapted to receive a blender shaft (not shown) to which blade 10 is fixedly attached. The blender shaft rotates to drive the movement of blade 10 inside a blender pitcher (not shown). As such, aperture 13 and the blender shaft define the axis of rotation of blade 10. Body portion 12 also includes an upper surface 15 and a lower surface 16.

As seen in FIGS. 1-4, blade 10 is configured for counter-clockwise rotation in the blender pitcher. Extending outwardly from body portion 12 is a first blade wing 21 and a second blade wing 22. First blade wing 21 and second blade wing 22, respectively, have upper surfaces 23, 24 and lower surfaces 25, 26.

First blade wing 21 and second blade wing 22 are asymmetrically disposed relative to body portion 12. For example, first blade wing 21 shares the same horizontal plane as body portion 12. Consequently, body portion 12 and first blade wing 21 are uniformly connected, and there is a smooth transition between their upper and lower surfaces.

Second blade wing 22, unlike first blade wing 21, is oriented at an acute angle with respect to the horizontal plane shared by body portion 12 and first blade wing 21. In other words, upper surface 24 of first blade wing 21 is obtusely oriented with respect to body portion 12, and lower surface 26 is reflexively oriented with respect to body portion 12.

Extending outwardly from the distal ends of first blade wing 21 and second blade wing 22 are a first wing tip 31 and a second wing tip 32, respectively. Wing tips 31 and 32, respectively, include upper surfaces 33, 34 and lower surfaces 35, 36. As seen in FIGS. 1-4, upper surfaces 33, 34 are respectively oriented at obtuse angles with respect to upper surfaces 23, 24. The angled relationship between first blade wing 21 and first wing tip 31, and between second blade wing 22 and second wing tip 32 increases the dimensions of the cutting patterns of blade 10.

The cutting patterns of blade 10 are defined by leading edges 41, 42 of first blade wing 21 and second blade wing 22, respectively, and by leading edges 43, 44 of first wing tip 31 and second wing tip 32, respectively. Each of these leading edges are sharpened by respectively beveling first blade wing 21, second blade wing 22, first wing tip 31 and second wing tip 32. As seen in FIG. 2, leading edges 41 and 43 are formed along one side of blade 10 and share cutting responsibilities along that side of the blade. Furthermore, leading edges 42 and 44 are formed along the other side of blade 10 and share cutting responsibilities along that side of the blade. Therefore, as blade 10 rotates counterclockwise about its axis of rotation, leading edges 41 and 43 and leading edges 42 and 44 cut through the working medium provided in the blender pitcher.

Because first blade wing 21 and second blade wing 22 are asymmetrically oriented with respect to body portion 12, blade 10 has two cutting patterns. The first cutting pattern is substantially planar, and is formed by leading edge 41 of first blade wing 21 and leading edge 43 of first wing tip 31. The second cutting pattern is substantially frusto-conical, and is formed by leading edge 42 of first blade wing 22 and leading edge 44 of second wing tip 32.

As seen in FIGS. 1-4, a first wing flap 51 and a second wing flap 52, respectively, extend outwardly from trailing edges 47 and 48 of first blade wing 21 and second blade wing 22, respectively. Wing flaps 51 and 52 are provided to control the axial flow of working medium relative to first cutting pattern and second cutting pattern irrespective of the angle of attack of first blade wing 21 and second blade wing 22. For example, wing flaps 51 and 52 can be angled downwardly or upwardly to respectively increase the effective camber of upper surfaces 23, 24 and lower surfaces 25, 26.

Because of the effective camber increase caused by the addition of wing flaps 51 and 52, low pressures are generated by wing flaps 51 and 52. The low pressures generated by wing flaps 51 and 52 compel axial movement of the working medium. Wing flaps 51 and 52 include upper surfaces 53, 54 and lower surfaces 55, 56, respectively, and as seen in FIGS. 1-4, wing flaps 51 and 52 are angled downwardly. That is, their lower surfaces 55, 56 are oriented at obtuse angles with respect to lower surfaces 25, 26.

As blade 10 is rotating, working medium flowing underneath blade 10 impinges downwardly angled wing flaps 51 and 52. As such, lower surfaces 55, 56 of wing flaps 51 and 52 (as seen in FIGS. 1-4) deflect the working medium away from blade 10. Such deflection not only causes wing flaps 51 and 52 to batter against the working medium, but also pushes the working medium away from the path of wing flaps 51 and 52, and generates low pressures adjacent upper surfaces 53, 54.

The low pressures generated by downwardly angled wing flaps 51 and 52 draw the working medium to upper surfaces 53, 54. Furthermore, because upper surface 53 is below leading edges 41 and 43, and upper surface 54 is below leading edges 42 and 44, the working medium is drawn downwardly through the first cutting pattern and second cutting pattern. As such, the downward angle of wing flaps 51 and 52, and the axial movement caused thereby enhances the cutting ability of blade 10.

The opposite holds true if wing flaps 51 and 52 are angled upwardly. For example, as blade 10 is rotating, working medium flowing above blade 10 impinges upwardly angled wing flaps 51 and 52. As such, upper surfaces 53, 54 of wing flaps 51 and 52 deflect the working medium away from the path of wing flaps 51 and 52. In the process of deflecting the working medium, wing flaps 51 and 52 batter against the working medium, and generate low pressures adjacent lower surfaces 55, 56. These low pressures draw the working medium to lower surfaces 55, 56. Because lower surface 55 is above leading edges 41 and 43, and lower surface 56 is above leading edges 42 and 44, the working medium is drawn upwardly through the first cutting pattern and second cutting pattern. As such, the upward angle of wing flaps 51 and 52, and the axial movement caused thereby enhances the cutting ability of blade 10.

Whether wing flaps 51 and 52 are angled upwardly or downwardly, the amount of working medium flowing across the first cutting pattern and second cutting pattern could be increased by increasing the slopes of wing flaps 51 and 52. Furthermore, as discussed above, the downward and upward angle of wing flap 51 draws the working medium downwardly and upwardly, respectively, through the first cutting pattern. Therefore, with reference to blade wing 21 (which has an angle of attack of zero), the amount and direction of the axial flow of the working medium can be controlled by wing flap 51 irrespective of the angle of attack first blade wing 21.

In addition to controlling the axial flow of the working medium, the orientation of wing flaps 51 and 52 can also control the radial flow of the working medium relative the axis of rotation of blade 10. For example, as seen in FIGS. 1-4, wing flaps 51 and 52 are canted inwardly relative to leading edges 41, 42, respectively. That is, because first blade wing 21 and second blade wing 22 gradually narrow as blade wings 21 and 22 extend outwardly from the body portion 12, trailing edges 47 and 48 are angled such that wing flaps 51 and 52 are canted inwardly. As such, the working medium deflected away from the path of wing flaps 51 and 52 as blade 10 is rotating is pushed radially inwardly relative to first blade wing 21 and second blade wing 22, respectively.

The opposite holds true if wing flaps 51 and 52 are canted outwardly relative to leading edges 41, 42, respectively. For example, if first blade wing 21 and second blade wing 22 gradually broaden as blade wings 21 and 22 extend outwardly from the body portion 12, trailing edges 47 and 48 are angled such that wing flaps 51 and 52 are canted outwardly. As such, the working medium deflected away from the path of wing flaps 51 and 52 as blade 10 is rotating is pushed radially outwardly relative to first blade wing 21 and second blade wing 22, respectively.

Therefore, both axial and radial flow can be controlled by the orientation of wing flaps 51 and 52. Moreover, when angled downwardly, wing flaps 51 and 52 can also be used to dislodge working medium from underneath blade 10, which after being dislodged, can be acted on by the first cutting pattern and second cutting pattern.

A blender blade made in accordance with another embodiment of the present invention is generally indicated by the numeral 60, and is shown in FIGS. 5-8. Blade 60 includes a body portion 62, and an aperture 63. Body portion 62 includes an upper surface 65 and a lower surface 66. Like aperture 13 of blade 10, aperture 63 is adapted to receive a blender shaft, and blade 60 is fixedly attached to the blender shaft. The blender shaft rotates to drive the movement of blade 60 inside a blender pitcher, and consequently, aperture 63 and the blender shaft define the axis of rotation of blade 60.

Blade 60 is configured for counter-clockwise rotation in the blender pitcher. Extending outwardly from body portion 62 is a first blade wing 71 and a second blade wing 72. First blade wing 71 and second blade wing 72, respectively, have upper surfaces 73, 74 and lower surfaces 75, 76.

First blade wing 71 and second blade wing 72 are mirror images of one another on opposite side of body portion 62. In addition, first blade wing 71 and second blade wing 72 share the same horizontal plane with body portion 62. Consequently, body portion 62, first blade wing 71 and second blade wing 72 are uniformly connected, and there is a smooth transition between their upper and lower surfaces.

Extending outwardly from the distal ends of first blade wing 71 and second blade wing 72 are a first wing tip 81 and a second wing tip 82, respectively. First wing tip 81 and second wing tip 82, respectively, include upper surfaces 83, 84 and lower surfaces 85, 86. As seen in FIGS. 5-8, upper surfaces 83, 84 are oriented at obtuse angles with respect to upper surfaces 73, 74. The angled relationship between first blade wing 71 and first wing tip 81, and between second blade wing 72 and second wing tip 82 increases the dimensions of the cutting pattern of blade 60.

Figure 6:
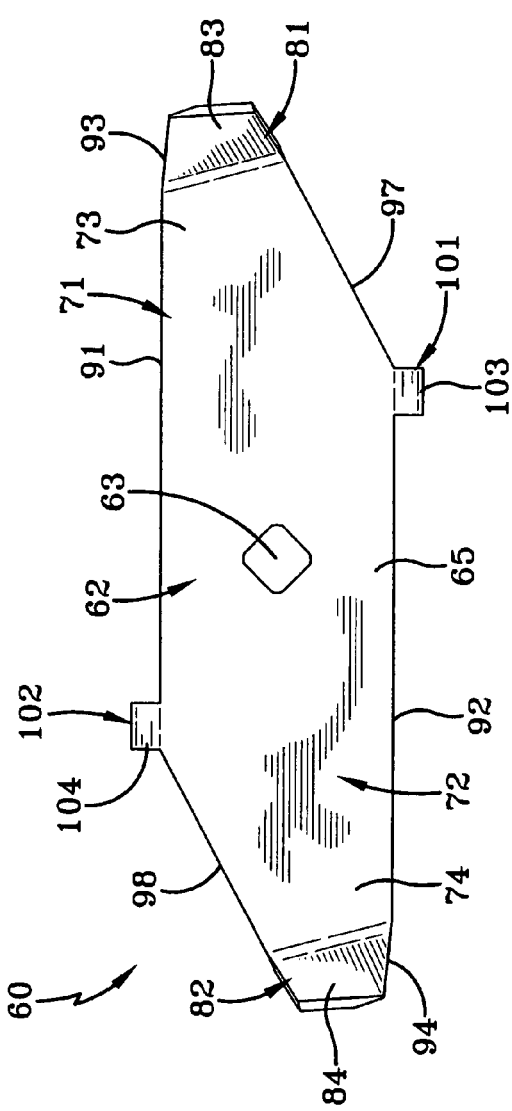
FIG. 6 is a plan view taken from above the blender blade of the embodiment of FIG. 5.
Figure 7:
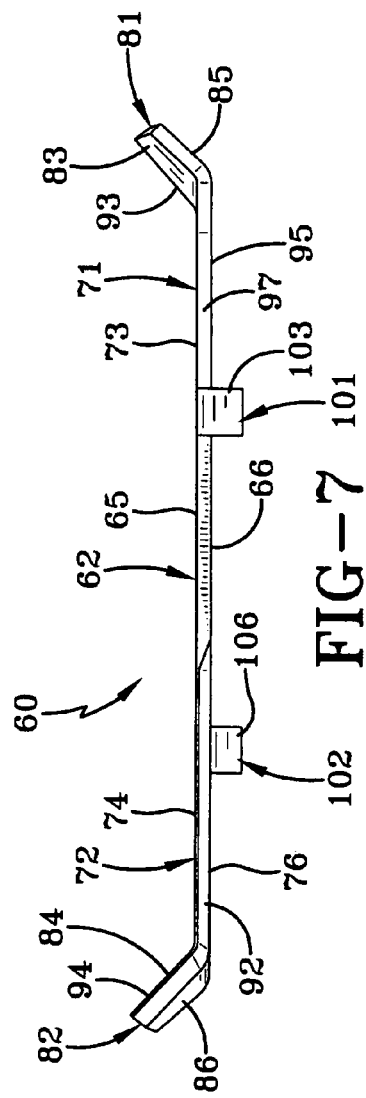
FIG. 7 is an elevational view taken from the front of the blender blade of the embodiment of FIG. 5.
Figure 9:
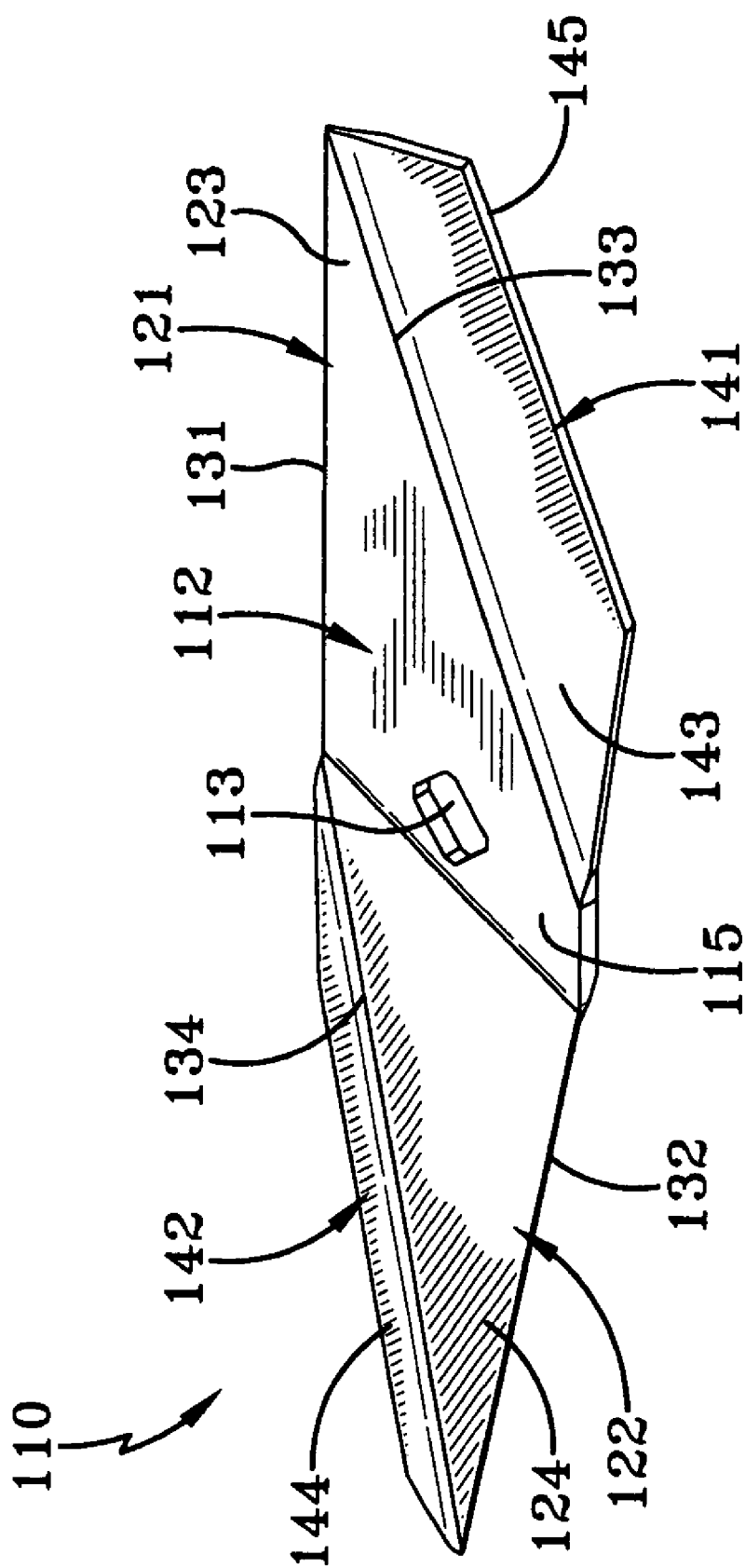
FIG. 9 is a perspective view of the blender blade made in accordance with another embodiment of the present invention.
Figure 12:
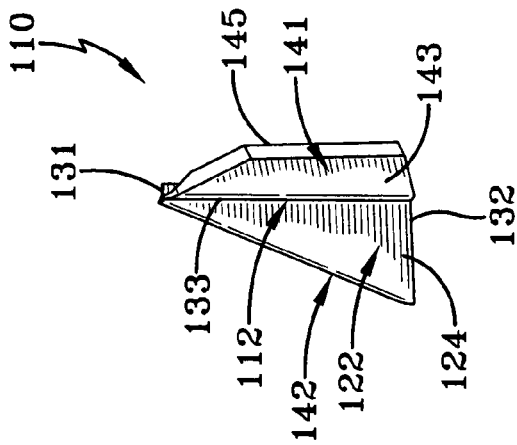
FIG. 12 is an elevational view taken from the side of the blender blade of the embodiment of FIG. 9.

The cutting patterns of blade 60 are defined by leading edges 91, 92 of first blade wing 71 and second blade wing 72, respectively, and by leading edges 93, 94 of first wing tip 81 and second wing tip 82. Each of these leading edges are sharpened by the beveling first blade wing 71, second blade wing 72, first wing tip 81 and second wing tip 82. As seen in FIG. 6, leading edges 91 and 93 are formed along one side of blade 60 and share cutting responsibilities along that side of the blade. Furthermore, leading edges 92 and 94 are formed along the other side of blade 60 and share cutting responsibilities along that side of the blade. Therefore, as blade 60 rotates counterclockwise about its axis of rotation, leading edges 91 and 93 and leading edges 92 and 94 cut through the working medium provided in the blender pitcher.

Because first blade wing 71 and second blade wing 72 share the same horizontal plane with body portion 62, and leading edges 91 and 93 and leading edges 92 and 94 are aligned in that horizontal plane, blade 60 has one cutting pattern which is substantially planar.

As seen in FIGS. 5-8, a first wing flap 101 and a second wing flap 102 extend outwardly from blade 60 opposite leading edges 91, 92, respectively. Wing flaps 101 and 102 are provided to control the flow of working medium relative to the cutting pattern irrespective of the angle of attack of first blade wing 71 and second blade wing 72, and can be provided on body portion 62, first blade wing 71 or second blade wing 72. As seen in FIGS. 5-8, first wing flap 101 extends outwardly from body portion 62 adjacent trailing edge 97, and second wing flap 102 extends outwardly from body portion 62 adjacent trailing edge 98.

Wing flaps 101 and 102 can be angled downwardly or upwardly (depending upon their relative position) to increase the effective camber of upper surface 65, lower surface 66, upper surfaces 73, 74 and lower surfaces 75, 76. Because of the effective camber increase caused by the addition of wing flaps 101 and 102, low pressures are generated by wing flaps 101 and 102. The low pressures generated by wing flaps 101 and 102 compel axial movement of the working medium.

Wing flaps 101 and 102 are shown as being generally hook-shaped, and include first curved surfaces 103, 104 and second curved surfaces 105, 106, respectively. As seen in FIGS. 5-8, wing flaps 101 and 102 are angled downwardly. As such, a majority of second curved surfaces 105, 106 are obtusely oriented, relative to lower surface 66 and lower surfaces 75, 76.

As blade 60 is rotating, working medium flowing underneath blade 60 impinges downwardly angled wing flaps 101 and 102. In fact, second curved surfaces 105, 106 deflects the working medium away from blade 60, and in deflecting the working medium, in effect batters larger particles provided in the working medium. Such deflection also pushes the working medium away from the path of wing flaps 101 and 102, thereby generating low pressures adjacent first curved surfaces 103, 104. These low pressures draw the working medium to first curved surfaces 103, 104, and because of the vertical position of first curved surfaces 103, 104 relative to the cutting pattern, the working medium is drawn axially downwardly through the first cutting pattern. The axial movement caused by wing flaps 101, 102, thereby enhances the cutting ability of blade 60.

The opposite holds true if wing flaps 101 and 102 are angled upwardly. As blade 60 is rotating, working medium flowing above blade 60 impinges upwardly angled wing flaps 101 and 102. In fact, first curved surfaces 103, 104 deflect the working medium away from blade 60, and in deflecting the working medium, in effect batters larger particles provided in the working medium. Such deflection also pushes the working medium away from the path of wing flaps 101 and 102, thereby generating low pressures adjacent second curved surfaces 105, 106. These low pressures draw the working medium to second curved surfaces 105, 106, and because of the vertical position of second curved surfaces 105, 106 relative to the cutting pattern, the working medium is drawn axially upwardly through the first cutting pattern. The axial movement caused by wing flaps 101, 102, thereby enhances the cutting ability of blade 60.

Whether wing flaps 101 and 102 are angled upwardly or downwardly, the larger particles in the working medium are pulverized. First curved surfaces 103, 104 and second curved surfaces 105, 106 (depending on the orientation of wing flaps 101) will break apart these larger particles, and allow the remaining particles to contact leading edges 91 and 93 and leading edges 92 and 94. However, when angled downwardly, wing flaps 101 and 102 can also be used to dislodge working medium from underneath blade 60. After being dislodged, such working medium can be acted on by the cutting pattern of blade 60. Moreover, even though first blade wing 71 and second blade wing 72 have angles of attack of zero degrees, the amount and direction of the axial flow of the working medium can be controlled by wing flaps 101 and 102 irrespective of the angle of attack first blade wing 71 and second blade wing 72.

In addition to controlling the axial flow of the working medium, the orientation of wing flaps 101 and 102 can also control the radial flow of the working medium relative to the axis of rotation of blade 60. For example, if first wing flap 101 and second wing flap 102 are canted inwardly or outwardly with respect to leading edges 91, 92, the radial flow of the working medium could be selectively directed. When the wing flaps 101 and 102 are canted inwardly relative to the leading edges 91, 92, respectively, the working medium impinges the wing flaps 101 and 102, and is directed inwardly. When the wing flaps 101 and 102 are canted outwardly relative to the leading edges 91, 92, respectively, the working medium impinges the wing flaps 101 and 102, and is directed outwardly. Therefore, both the axial and radial flow of the working medium can be controlled by the orientation of wing flaps 101 and 102.

A blender blade made in accordance with another embodiment of the present invention is generally indicated by the numeral 110, and is shown in FIGS. 9-12. Blade 110 includes a body portion 112, and an aperture 113 provided in body portion 112 is adapted to receive a blender shaft. Body portion 112 also includes an upper surface 115 and a lower surface 116. Blade 110 is fixedly attached to the blender shaft, and the rotation of the blender shaft drives the movement of blade 110 inside a blender pitcher. Consequently, aperture 113 and the blender shaft define the axis of rotation of blade 110.

Blade 110 is configured for counter-clockwise rotation in the blender pitcher, and extending outwardly from body portion 112 is a first blade wing 121 and a second blade wing 122. First blade wing 121 and second blade wing 122, respectively, have upper surfaces 123, 124 and lower surfaces 125, 126.

As seen in FIGS. 9-12, first blade wing 121 and second blade wing 122 are asymmetrically disposed relative to body portion 112. For example, first blade wing 121 shares the same horizontal plane as body portion 112. Consequently, body portion 112 and first blade wing 121 are uniformly connected, and thereby create a smooth transition between their upper and lower surfaces. However, second blade wing 122, unlike first blade wing 121, is oriented at an acute angle with respect to the horizontal plane shared by body portion 112 and first blade wing 121. As such, upper surface 124 of second blade wing 121 is obtusely oriented with respect to body portion 112, and lower surface 126 is reflexively oriented with respect to body portion 112.

Figure 10:
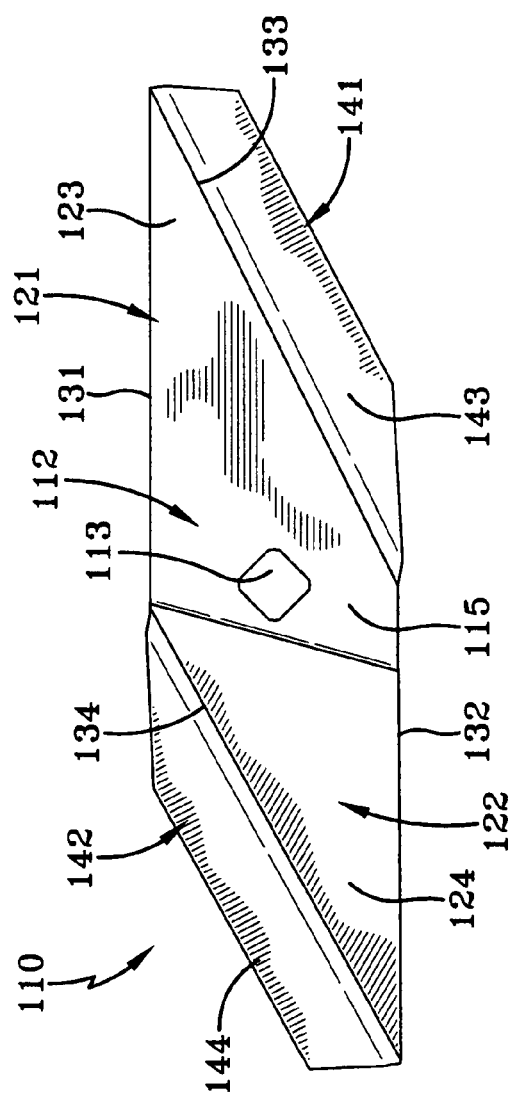
FIG. 10 is a plan view taken from above the blender blade of the embodiment of FIG. 9.
Figure 11:
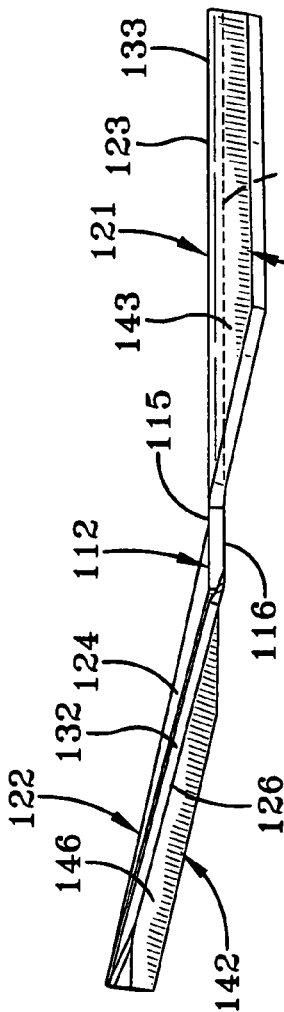
FIG. 11 is an elevational view taken from the front of the blender blade of the embodiment of FIG. 9.

Because first blade wing 121 and second blade wing 122 do not include wing tips, the cutting patterns of blade 110 are defined by leading edges 131, 132 of first blade wing 121 and second blade wing 122, respectively. Leading edges 131, 132 are sharpened by beveling first blade wing 121 and second blade wing 122, respectively. As seen in FIG. 10, leading edge 131 is adapted to handle the cutting responsibility on one side of blade 110, and leading edge 132 is adapted to handle the cutting responsibility on the other side of blade 110. Consequently, as blade 110 rotates counterclockwise about its axis of rotation, leading edge 131 of first blade wing 121 and leading edge 132 of second blade wing 122 cut through the working medium.

However, because first blade wing 121 and second blade wing 122 are asymmetrically oriented with respect to body portion 112, blade 110 has two cutting patterns. The first cutting pattern is substantially planar, and is formed by leading edge 131 of first blade wing 121. The second cutting pattern is substantially frusto-conical, and is formed by leading edge 132 of second blade wing 122.

As seen in FIGS. 9-12, a first wing flap 141 and a second wing flap 142, respectively, extend outwardly from first blade wing 121 and second blade wing 122. Wing flaps 141 and 142 are angled with respect to first blade 121 and second blade wing 122 along bend lines 133 and 134, respectively. Wing flaps 141 and 142 are provided to control the flow of working medium relative to the first cutting pattern and second cutting pattern irrespective of the angle of attack of first blade wing 121 and second blade wing 122.

For example, wing flaps 141 and 142 can be angled downwardly or upwardly to respectively increase the effective camber of upper surfaces 123, 124 and lower surfaces 125, 126. However, because of the effective camber increase caused by the addition of wing flaps 141 and 142, low pressures are generated by wing flaps 141 and 142, and these low pressures compel axial movement of the working medium.

For example, wing flaps 141 and 142, respectively, include upper surfaces 143, 144 and lower surfaces 145, 146. Wing flaps 141 and 142, shown in FIGS. 9-12, are angled downwardly, and lower surfaces 145, 146 are oriented at obtuse angles with respect to lower surfaces 125, 126. Therefore, as blade 110 is rotating, working medium flowing underneath blade 110 impinges downwardly angled wing flaps 141 and 142. As such, lower surfaces 145, 146 of wing flaps 141 and 142 (as seen in FIGS. 9-12) deflect the working medium away from blade 110. Such deflection not only causes wing flaps 141 and 142 to batter against the working medium, but also pushes the working medium away from the path of wing flaps 141 and 142, and generates low pressures adjacent upper surfaces 143, 144.

The low pressures generated by downwardly angled wing flaps 141 and 142 draw the working medium to upper surfaces 143, 144. Furthermore, because upper surface 143 is below leading edge 131, and upper surface 144 is below leading edge 132, the working medium is drawn downwardly through the first cutting pattern and second cutting pattern. As such, the downward angle of wing flaps 141 and 142, and the axial movement caused thereby enhances the cutting ability of blade 110.

The opposite holds true if wing flaps 141 and 142 are angled upwardly. For example, as blade 110 is rotating, working medium flowing above blade 110 would impinge upwardly angled wing flaps 141 and 142. As such, upper surfaces 143, 144 of wing flaps 141 and 142 deflect the working medium away from the path of wing flaps 141 and 142. In the process of deflecting the working medium, wing flaps 141 and 142 batter against the working medium, and generate low pressures adjacent lower surfaces 145, 146. These low pressures draw the working medium to lower surfaces 145, 146. Because lower surface 145 is above leading edges 131, and lower surface 146 is above leading edge 132, the working medium is drawn upwardly through the first cutting pattern and second cutting pattern. As such, the upward angle of wing flaps 141 and 142, and the axial movement caused thereby enhances the cutting ability of blade 110.

Whether wing flaps 141 and 142 are angled upwardly or downwardly, the amount of working medium flowing across the first cutting pattern and second cutting pattern could be increased by increasing the slopes of wing flaps 141 and 142. Furthermore, as discussed above, the downward and upward angles of wing flaps 141 and 142 draw the working medium downwardly and upwardly, respectively. Therefore, with reference to blade wing 121 (which has an angle of attack of zero), the amount and direction of the axial flow of the working medium can be controlled by wing flap 141 irrespective of the angle of attack of first blade wing 121.

In addition to controlling the axial flow of the working medium, the orientation of wing flaps 141 and 142 can also control the radial flow of the working medium relative to the axis of rotation of blade 110. For example, as seen in FIGS. 9-12, wing flaps 141 and 142 are canted inwardly relative to leading edges 131, 132, respectively. That is, because first blade wing 121 and second blade wing 122 gradually narrow as blade wings 121 and 122 extend outwardly from body portion 112, bend lines 133 and 134 are angled such that wing flaps 141 and 142 are canted inwardly. As such, working medium deflected away from the path of wing flaps 141 and 142 as blade 110 is rotating is pushed inwardly relative to first blade wing 121 and second blade wing 122, respectively.

The opposite holds true if wing flaps 141 and 142 are canted outwardly relative to leading edges 131, 132, respectively. For example, if first blade wing 121 and second blade wing 122 gradually broaden as blade wings 121 and 122 extend outwardly from body portion 112, bend lines 133 and 134 are angled such that wing flaps 141 and 142 are canted outwardly. As such, the working medium deflected away from the path of wing flaps 141 and 142 as blade 110 is rotating is pushed outwardly relative to first blade wing 121 and second blade wing 122, respectively.

Therefore, both the axial and radial flow of the working medium can be controlled by the orientation of wing flaps 141 and 142. Moreover, when angled downwardly, wing flaps 141 and 142 can also be used to dislodge working medium from underneath blade 110, and such working medium, after being dislodged, can be acted on by the first cutting pattern and second cutting pattern.

In light of the foregoing, it should thus be evident that a blender blade constructed as described herein substantially improves the art and otherwise accomplishes the objects of the present invention.

What is claimed is:

1. A blender blade for cutting through a working medium provided in a blender pitcher, comprising a body portion having an upper surface and a lower surface, said body portion including an aperture effectively defining an axis of rotation for the blender blade; a first blade wing extending from said body portion and having an upper surface and a lower surface, said upper surface of said body portion smoothly transitioning into said upper surface of said first blade wing; a second blade wing extending from said body portion and having an upper surface and a lower surface, wherein said first blade wing and said second blade wing are asymmetrically oriented with respect to said body portion, said upper surface of said second blade wing being obtusely oriented relative to said body portion; a sharp beveled leading edge provided on said first blade wing and a sharp beveled leading edge provided on said second blade wing, said leading edges thereby being adapted to cut through the working medium during rotation of said blender blade; a trailing edge on said first blade wing opposed to said leading edge on said first blade wing, and a trailing edge on said second blade wing opposed to said leading edge on said second blade wing; a wing flap extending downwardly from said trailing edge of said first blade wing and said trailing edge of said second blade wing, wherein said wing flaps are canted inwardly at a cant angle to control the radial flow of the working medium relative to the axis of rotation; and a wing tip extending upwardly at an obtuse angle from the end of said first blade wing and from the end of said second blade wing.

2. A blender blade according to claim 1, wherein said first blade wing and said second blade wing gradually narrow as said first blade wing and said second blade wing extend outwardly from said body portion, defining said cant angle of said wing flaps.

3. A blender blade according to claim 1, wherein said second blade wing is angled so that said leading edge is above said trailing edge whereby the lower surface of said second blade wing impinges the working medium during rotation of said blender blade.

4. A blender blade comprising a body portion, a first wing extending from said body portion, a second wing extending from said body portion and opposed to said first wing, wherein said first wing and said second wing extend from said body portion in the same plane as said body portion, each said wing having a sharp beveled leading edge and an opposed trailing edge, a wing flap extending downwardly from a portion of said trailing edge of each said wing, and a wing tip extending upwardly at an obtuse angle from the end of each said wing.

5. A blender blade for comminuting and mixing various ingredients in a working medium in a blender pitcher, comprising a central body portion having an upper and lower surface, said central body portion including an aperture effectively defining an axis of rotation for the blender blade; a plurality of blade wings extending outwardly from said central body portion, said plurality of blade wings each having a sharpened leading edge for cuffing through material as the blade rotates, and each having a trailing edge; at least one of said plurality of blade wings extending outward from the central body portion in the same horizontal plane as the central body portion;

at least one of said plurality of blade wings extending outward from the central body portion in a plane other than the horizontal plane of said central body portion;

wing flaps extending from said trailing edge of said plurality of blade wings, said wing flaps being bent with respect to said plurality of blade wings defining a flap angle, and said wing flaps being disposed at an angle with respect to said leading edge defining a cant angle; whereby said wing flaps control the axial and radial flow of material in the blender pitcher.

6. A blender blade according to claim 5, wherein said angularly disposed blade wing is angled so that said leading edge is above said trailing edge whereby the lower surface of said angularly disposed blade wing impinges the working medium during rotation of said blender blade.

7. A blender blade according to claim 5, wherein said wing flaps are bent downward from said wings.

8. A blender blade according to claim 5, wherein said cant angle is such that said wing flaps direct the working medium radially inward along the axis of said wing flaps.

9. A blender blade for comminuting and mixing ingredients in a working medium in a blender pitcher comprising a first blade wing positioned in a plane, a second blade wing positioned in a plane different from said plane of said first blade wing, an aperture in said plane of said first blade wing and defining the axis of rotation of the blade, said blade wings each having a sharpened leading edge for cutting material as the blade rotates and a trailing edge, and a wing flap extending downwardly from said trailing edge of each said blade wing.

10. The blender blade of claim 9 wherein said plane of said first blade wing is generally horizontal.

11. The blender blade of claim 9 further comprising a wing tip extending upwardly at an obtuse angle from the end of each said blade wing.

12. The blender blade of claim 9, said wing flaps being bent with respect to said blade wings defining a flap angle, and said wing flaps being disposed at an angle with respect to said leading edge defining a cant angle.

* * * * *